(12) United States Patent
Hettiarachchi et al.

(10) Patent No.: US 12,155,640 B2
(45) Date of Patent: Nov. 26, 2024

(54) SYSTEMS AND METHODS FOR CLOUD FEDERATED TOKEN JUST IN TIME AUTHORIZATION

(71) Applicant: JPMORGAN CHASE BANK, N.A., New York, NY (US)

(72) Inventors: Kanishka Hettiarachchi, Chatham, NJ (US); Ricky Hei Wong Chan, Woodside, NY (US); Renfei Zhang, Plano, TX (US); Ross S Indyke, New York, NY (US); Vijay Basker Balakrishnan, Coppell, TX (US); Vladimir Belinkis, Freehold, NJ (US); Joseph Schilling, Columbus, OH (US); Ramesh Krishnamurthy, Prosper, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 258 days.

(21) Appl. No.: 17/506,954

(22) Filed: Oct. 21, 2021

(65) Prior Publication Data
US 2023/0129824 A1 Apr. 27, 2023

(51) Int. Cl.
*H04L 29/06* (2006.01)
*H04L 9/40* (2022.01)
*H04L 61/4505* (2022.01)

(52) U.S. Cl.
CPC ...... *H04L 63/0807* (2013.01); *H04L 61/4505* (2022.05); *H04L 63/102* (2013.01);
(Continued)

(58) Field of Classification Search
None
See application file for complete search history.

(56) References Cited

U.S. PATENT DOCUMENTS 10,142,107 B2 * 11/2018 Frei .................. H04L 9/0869
10,154,037 B2 * 12/2018 Pattar ................ H04L 63/10
(Continued)

OTHER PUBLICATIONS

Pereira, Andre et al. Towards Scalability for Federated Identity Systems for Cloud-Based Environments. 2014 6th International Conference on New Technologies, Mobility and Security (NTMS). https://ieeexplore.ieee.org/stamp/stamp.jsp?tp=&arnumber=6814055 (Year: 2014).*

(Continued)

*Primary Examiner* — Jeremiah L Avery
(74) *Attorney, Agent, or Firm* — GREENBERG TRAURIG LLP

(57) ABSTRACT

Systems and methods for cloud federated token just in time authorization are disclosed. A method may include: (1) receiving, by a cloud authentication services computer program, authenticating information for a user from an active directory federation service computer program; (2) querying, by the cloud authentication services computer program, a plurality of backend services to validate the authenticating information; (3) communicating, by the cloud authentication services computer program, validation to the active directory federation service computer program, wherein the active directory federation service computer program is configured to generate a security token comprising one or more assertion, wherein the assertion comprises a limit on a session with the user at a cloud platform, and wherein the cloud platform is configured to receive the security token and a trusted federated endpoint executed by the cloud platform is configured to enforce the limit on the session.

14 Claims, 2 Drawing Sheets

(52) U.S. Cl.
CPC ............ *H04L 63/104* (2013.01); *H04L 63/20* (2013.01); *H04L 2463/082* (2013.01)

(56) References Cited

U.S. PATENT DOCUMENTS

| | | | |
|---|---|---|---|
| 10,523,541 B2* | 12/2019 | Rao | H04L 41/0893 |
| 10,841,316 B2* | 11/2020 | Innes | H04L 63/0823 |
| 2010/0250497 A1* | 9/2010 | Redlich | G06Q 10/06 |
| | | | 707/661 |
| 2014/0282586 A1* | 9/2014 | Shear | H04L 47/70 |
| | | | 718/104 |
| 2016/0034305 A1* | 2/2016 | Shear | G06F 16/285 |
| | | | 707/722 |
| 2021/0297447 A1* | 9/2021 | Crabtree | H04L 9/3213 |
| 2021/0390170 A1* | 12/2021 | Olden | H04L 63/08 |
| 2021/0392048 A1* | 12/2021 | Olden | H04L 41/0816 |

OTHER PUBLICATIONS

Moghaddam, Faraz Fatemi et al. A policy-based identity management schema for managing accesses in clouds. 2017 8th International Conference on the Network of the Future (NOF). https://ieeexplore.ieee.org/stamp/stamp.jsp?tp=&arnumber=8251226 (Year: 2017).*

* cited by examiner

SYSTEMS AND METHODS FOR CLOUD FEDERATED TOKEN JUST IN TIME AUTHORIZATION

BACKGROUND OF THE INVENTION

1. Field of the Invention

Embodiments relate generally to systems and methods for cloud federated token just in time authorization.

2. Description of the Related Art

Public and private cloud computing resources are ephemeral and ever changing. Traditional identity and access governance implementations such as Role Based Access Control (RBAC) or Attribute Based Access Control (ABAC) are not sufficient in managing cloud resources alone, often resulting in high profile cyber breaches due to misconfigured access in the cloud.

SUMMARY OF THE INVENTION

Systems and methods for cloud federated token just in time authorization are disclosed. According to an embodiment, a method for issuing cloud federated token just in time authorization may include: (1) receiving, by a cloud authentication services computer program, authenticating information for a user from an active directory federation service computer program; (2) querying, by the cloud authentication services computer program, a plurality of backend services to validate the authenticating information; (3) communicating, by the cloud authentication services computer program, validation to the active directory federation service computer program, wherein the active directory federation service computer program is configured to generate a security token comprising one or more assertion, wherein the assertion comprises a limit on a session with the user at a cloud platform, and wherein the cloud platform is configured to receive the security token and a trusted federated endpoint executed by the cloud platform is configured to enforce the limit on the session.

In one embodiment, the active directory federation service computer program may include a dynamic-link library (DLL) plugin.

In one embodiment, the DLL plugin may include a HTML form with a plurality of security questions.

In one embodiment, the authenticating information may include multifactor authentication appliance data, a user role, and/or a ticket identifier.

In one embodiment, the cloud authentication services computer program may query an in-memory entitlements graph to validate the user role.

In one embodiment, the in-memory entitlements graph may validate the user role based on a stored user role definition.

In one embodiment, the in-memory entitlements graph may be updated periodically.

In one embodiment, the limit may be a time limit.

In one embodiment, the method may further include reviewing, by the cloud authentication services computer program, a log file from the cloud platform, wherein the log file comprises an activity performed by the user during the session; and verifying, by the cloud authentication services computer program, that the activity was authorized.

In one embodiment, the method may further include updating, by the cloud authentication services computer program, an in-memory entitlements graph to restrict the user in response to activity being unauthorized.

According to another embodiment, a system may include a federation server executing a cloud authentication service computer program and an active directory federation service computer program, wherein the cloud authentication service computer program receives authenticating information for a user from the active directory federation service computer program; a plurality authentication backend services that receive a validation query from cloud authentication services computer program comprising authenticating information and validates the authenticating information; and a cloud platform executing a trusted federated endpoint that receives an authentication token comprising a limit on a session with the user from the active directory federation service computer program and enforces the limit on the session.

In one embodiment, the federation server further may include a dynamic-link library (DLL) plugin used by the active directory federation service computer program.

In one embodiment, the DLL plugin may include a HTML form with a plurality of security questions.

In one embodiment, the authentication backend services may include a multifactor authentication appliance backend that validates multifactor authentication appliance data, an in-memory entitlements graph that validate a user role, and a ticket validation backend that validates a ticket.

In one embodiment, the in-memory entitlements graph may validate the user role based on a stored user role definition.

In one embodiment, the in-memory entitlements graph may be updated periodically.

In one embodiment, the limit may be a time limit.

In one embodiment, a log session review computer program may also receive a log file comprising an activity performed by the user during the session from the cloud platform and verifies that the activity was authorized.

In one embodiment, the log session review computer program may update an in-memory entitlements graph to restrict the user in response to activity being unauthorized.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for cloud federated token just in time authorization.

Embodiments may provide a cloud just in time ("JIT") solution that may leverage a knowledge graph backend to make authorization decisions prior to token issuance. This enables the dynamic adjustment of a risk posture via, for example, a login interface. The control may be integrated in the federation server process itself, allowing JIT control to dynamically issue valid signed claims/IAM federation authorization attributes without having to participate in complex federation metadata exchange as a claims provider trust and operationally costly certificate rotation procedures on a reoccurring basis. Embodiments may further integrate with third party multifactor authentication providers (such as SecurID RSA), allowing a seamless single point of entry for login without compromising the user experience and compatibility with cloud modern web-based authentication/authorization protocols.

Embodiments may be portable and may be deployed on a Microsoft Active Directory Federation Server deployment in a self-contained dynamic link library format.

In embodiments, backend services may be extended to any in-house security event or proprietary data lake services to influence and adjust the just in time access decisions. For example, the backend services may be extended to include change authorization validations.

Embodiments may be cloud platform agnostic, as long as the cloud platform accepts modern federation claims protocols such as SAML/OAuth for authentication/authorization.

Figure 1:
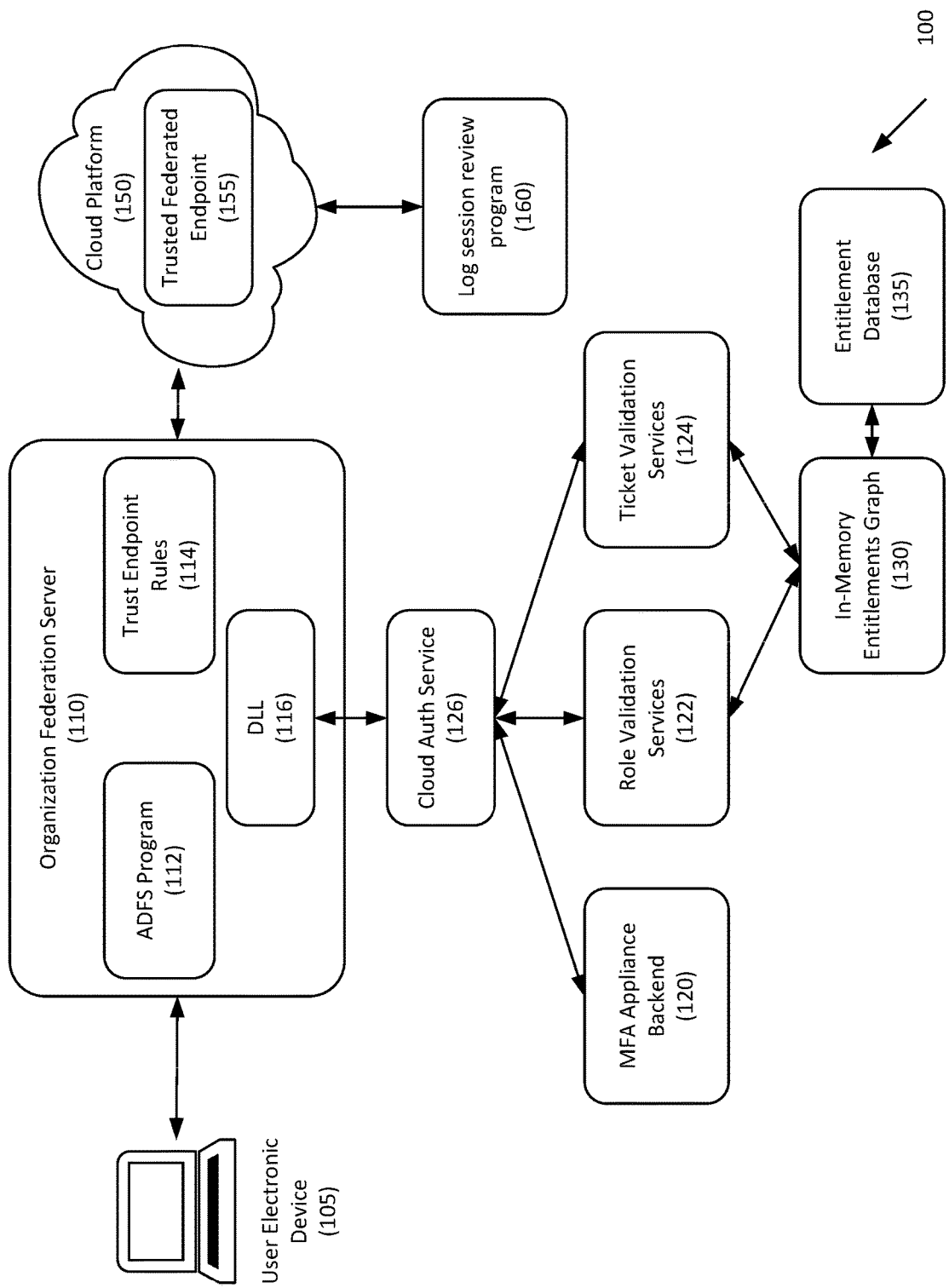
FIG. 1 depicts a system for cloud federated token just in time authorization according to an embodiment.

Referring to FIG. 1, a system for cloud federated token just in time authorization is disclosed according to one embodiment. System 100 may include user electronic device 105, which may be any suitable electronic device, that may access organizational federation server 110. Electronic device 105 may access organizational federation server 110 using, for example, a web browser, an application, a computer program, etc.

Organizational federation server 110 may include Active Directory Federation Services (ADFS) program 112, trust endpoint rules 114, and dynamic link library (DLL) plugin 116. In one embodiment, DLL plugin 116 may include instructions used by ADFS 112. DLL plugin 116 may include security challenge questions to be presented to a client executed by user electronic device 105 as a html form.

Cloud auth service 126 may be a backend service that responds to the client with the claims to be injected by ADFS server 112 into federated user login tokens. In embodiments, cloud auth service 126 may query a plurality of custom services (not shown) of the user before returning the claims for a security token, such as a SAML token.

In one embodiment, ADFS 112 using DLL 116 may present an authentication page to user electronic device 105. For example, the authentication page may request multifactor authentication (MFA) appliance data (e.g., a RSA SecurID passcode), a user role, ticket information, etc. Once received, cloud authentication services 126 may validate the MFA appliance data with MFA appliance backend 120, may validate the user role with role validation service 122, and may validate ticket information with ticket validation services 124.

In one embodiment, any suitable knowledge store validation may be used to validate the request.

Role validation services 122 and/or ticket validation services 124 may access in-memory entitlements graph 130. In-memory entitlements graph 130 may provide a real-time entitlement checks, and may provide "just in time" validation of organizational changes and incident management controls. For example, in-memory entitlements graph 130 may include an abstraction layer and repository for privileged infrastructure access entitlements. In-memory entitlements graph 130 may integrate with reference data systems, such as entitlements database 135, etc. to source entitlements reference data. It may also integrate with access provisioning systems for provisioning end-user privileges.

In one embodiment, in-memory entitlements graph 130 may be hosted by a server, a collection of servers, in the cloud, etc. In one embodiment, in-memory entitlements graph 130 may be accessed by an API call.

Examples of in-memory entitlements graph 130 and entitlements database 135 are disclosed in U.S. Pat. No. 10,951,624, the disclosure of which is hereby incorporated, by reference, in its entirety.

Entitlements database 135 may provide an identification of asset entitlements to which users, groups of users, roles, etc. within an organization may have permission to access.

ADFS program 112 may generate the security token (e.g., a SAML token) for the user once cloud authentication services 126 has authenticated the information received from user electronic device.

Trust endpoint rules 114 may provide configuration rules and/or policies for ADFS program 112. For example, trust endpoint rules 114 may govern the attributes returned by cloud auth service 126 that may be included in the security token. Trust endpoint rules 114 may also transform claims with regular expressions, string replacements, etc. In one embodiment, trust endpoint rules 114 may dynamically specify the duration that access may be granted (e.g., in seconds, such as 3600 seconds), session tags, which may be used to audit and reconcile the claims were granted in the session in native cloud platform logs, etc. For example, a unique incident ticket number may be inserted as a session tag, and the session tag may later be used to pull the event associated with the unique incident ticket number from the cloud platform and verify the access time, user, resources accessed, etc.

Cloud platform 150 may provide cloud services to user electronic device 105 based on the security token. Cloud platform may be provided by any suitable cloud platform, including Amazon Web Services, Google Cloud, Microsoft Azure, etc. In one embodiment, if the security token has expired, access will no longer be granted. Cloud platform 150 may be provided by any cloud platform that uses federation protocols.

Cloud platform 150 may include trusted federated endpoint 155 that may enforce assertions and/or endpoint rules in the security token.

Log session review computer program 160 may receive activity logs from cloud platform 150 and may review the logs to verify that the users are performing authorized activities and not bypassing or exploring beyond assigned privileges and access and further identifying any deviations from approved access and behavior.

Figure 2:
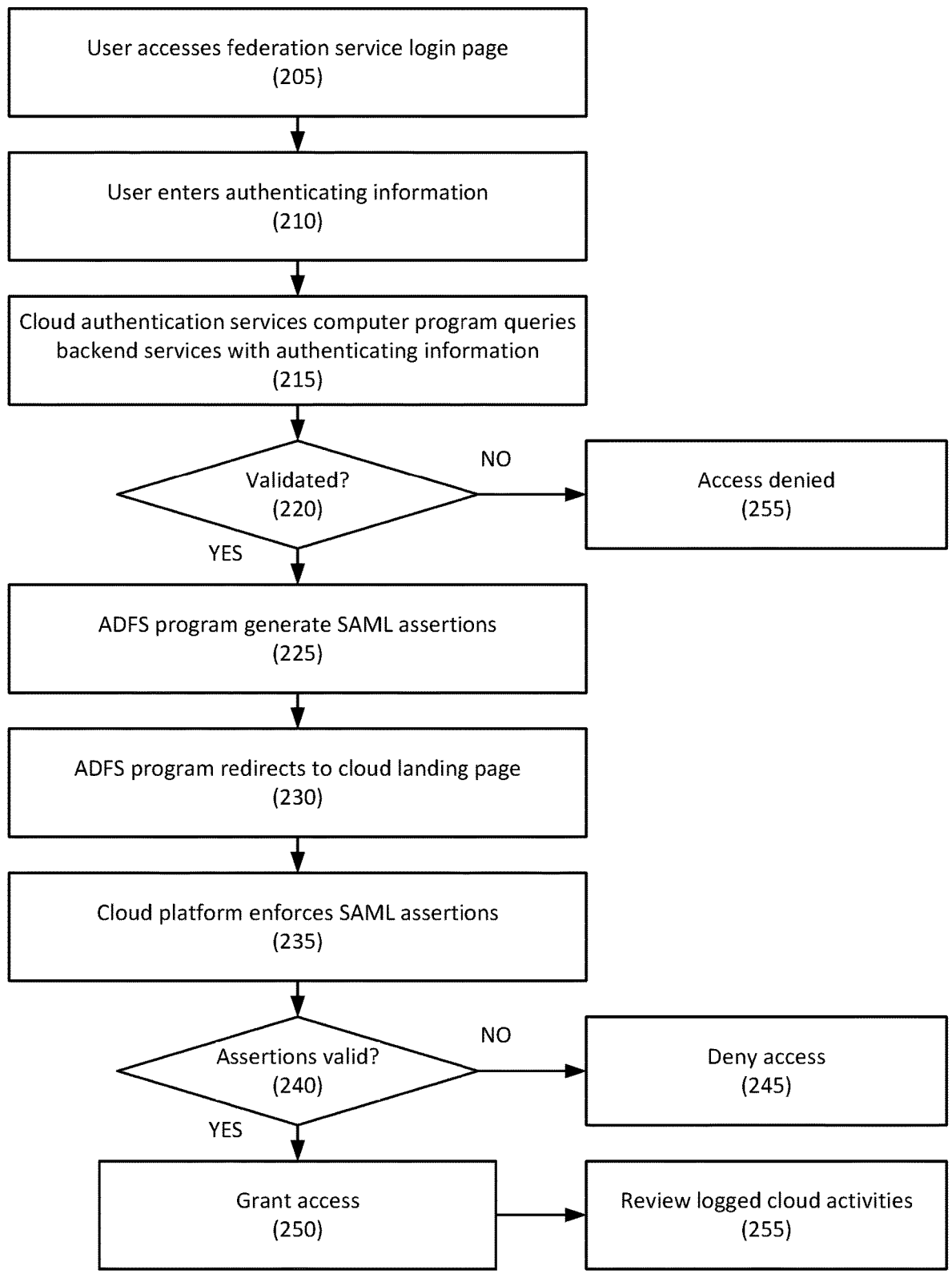
FIG. 2 depicts a method for cloud federated token just in time authorization according to an embodiment.

Referring to FIG. 2, a method for cloud federated token just in time authorization is disclosed according to one embodiment. In step 205, a user may access a federation service login page using, for example, a user electronic device. The federation service login page may be provided by an Active Directory Federation Services (ADFS) using a DLL plugin.

In step 210, the user may enter authenticating information. For example, the user may enter MFA appliance data (e.g., a RSA SecurID passcode), a user role, ticket information, etc. Other and/or additional authenticating information may be received as is necessary and/or desired.

In step 215, a cloud authentication services computer program may query one or more backend services to validate the authenticating information. For example, the cloud authentication services computer program may validate the MFA appliance data with an MFA appliance backend, the role with role validation services, and the ticket with ticket validation services. In one embodiment, any suitable knowledge store validation may be used to validate the request.

In one embodiment, the cloud authentication services computer program may access an in-memory entitlements graph to validate the authenticating information. For example, the cloud authentication services computer program may retrieve role definitions for the user role. As used herein, a use role, such as system administrator, may have a role definition. The role definition may specify attributes of the role, such as actions (e.g., what the role can do), system accounts (e.g., what the actions run as), and scope (e.g., what assets the actions can be performed on). The role may also have members, such as the UserIds that belong to the role (e.g., employees that are system administrators).

Examples of actions include read-write access to an operating system, create access to a configuration blueprint, execute access to a microservice, etc.

Also as used herein, a scope is a collection of assets, such as internal assets, cloud-based assets, hybrid assets, hardware, software, systems, areas, data, database instances, application instances, business flows, data objects, configuration blueprints, automation system assets/configuration items, abstracted entity types (e.g., an OS provisioning system's "node types"), etc.

In one embodiment, the in-memory entitlements graph may periodically be updated to reflect the role definitions, system accounts, and the scopes associated with those role definitions. In one embodiment, the in-memory entitlements graph may include data from human resources databases, policy data, and entitlement databases. Additional data sources may be used as is necessary and/or desired.

In one embodiment, the in-memory entitlements graph may link the data from these sources so that it has current information on UserIDs, roles, role members, role definitions (e.g., actions, system accounts, scope), etc.

In one embodiment, the in-memory entitlements graph may be periodically updated with data from, for example, HR systems, asset inventory, and the entitlements database. The update period may vary depending on data source (e.g., HR systems may provide updates daily, asset inventory may be updated hourly, etc.).

In one embodiment, the in-memory entitlements graph may identify the role definitions based on the UserId or similar, and may return the actions, system accounts, and scope to the cloud authentication services computer program for validation.

Examples of an in-memory entitlements graph and the use thereof are disclosed in U.S. Pat. No. 10,951,624, the disclosure of which is hereby incorporated, by reference, in its entirety.

In step 220, if the authenticating information is not validated, in step 255, access may be denied.

If the authenticating information is validated, in step 225, the ADFS computer program may generate a security token, such as a SAML token, that may include assertions and are passed to the cloud platform. For example, the ADFS computer program may apply rules, such as trust endpoint rules, to specify the roles, the duration of access, and session tags. The ADFS computer program may generate assertions, such as roleSessionName, CostCenter, Project, DurationSeconds, role identifiers, user principal identifies, etc.

In step 230, the ADFS computer program may redirect the session with the user electronic device to the landing page for the cloud platform with the security token. The assertions may be provided in the security token.

In step 235, the cloud platform may enforce the assertions in the security token. If, in step 240, the assertions are not valid (e.g., token has expired), in step 245, access may be denied, terminated, etc. For example, denying access may be the result of the evaluation of user role not meeting the requirements of an identity and access management (IAM) policy that may be pre-configured for the cloud resource, the security token being expired, etc.

If the assertions are valid (e.g., user role meets requirement of the IAM policy and the token is unexpired, in step 250, access is granted.

In step 255, a log session review computer program may receive log files from the cloud platform. The log files may identify the security token, the actions taken by the user at the cloud platform, etc. The log session review computer program may then verify that the users are performing authorized activities and not bypassing or exploring beyond assigned privileges and access and further identifying any deviations from approved access and behavior. If an anomalous or unauthorized activity is identified, embodiments may generate an alert, update the in-memory entitlements graph to restrict the user's access, deploy additional safeguards or restrictions to the resources at the cloud platform, etc.

Examples of such review are disclosed in U.S. patent application Ser. No. 16/855,079, the disclosure of which is hereby incorporated, by reference, in its entirety.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

The processing machine may a cloud-based processing machine, a physical processing machine, or combinations thereof.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programming logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method for cloud federated token just in time authorization, comprising:
   receiving, by a cloud authentication services computer program, authenticating information for a user from an active directory federation service computer program, wherein the authenticating information comprises multifactor authentication appliance data, a user role, and/or a ticket identifier;
   querying, by the cloud authentication services computer program, a plurality of backend services to validate the authenticating information, wherein the cloud authentication services computer program queries an in-memory entitlements graph to validate the user role; and
   communicating, by the cloud authentication services computer program, validation to the active directory federation service computer program, wherein the active directory federation service computer program is configured to generate a security token comprising one or more assertion, wherein the assertion comprises a limit on a session with the user at a cloud platform, and wherein the cloud platform is configured to receive the security token and a trusted federated endpoint executed by the cloud platform is configured to enforce the limit on the session.

2. The method of claim 1, wherein the active directory federation service computer program comprises a dynamic-link library (DLL) plugin.

3. The method of claim 2, wherein the DLL plugin comprise a HTML form with a plurality of security questions.

4. The method of claim 1, wherein the in-memory entitlements graph validates the user role based on a stored user role definition.

5. The method of claim 1, wherein the in-memory entitlements graph is periodically updated.

6. The method of claim 1, wherein the limit comprises a time limit.

7. A method for cloud federated token just in time authorization, comprising:
   receiving, by a cloud authentication services computer program, authenticating information for a user from an active directory federation service computer program;
   querying, by the cloud authentication services computer program, a plurality of backend services to validate the authenticating information;
   communicating, by the cloud authentication services computer program, validation to the active directory federation service computer program, wherein the active directory federation service computer program is configured to generate a security token comprising one or more assertion, wherein the assertion comprises a limit on a session with the user at a cloud platform, and wherein the cloud platform is configured to receive the security token and a trusted federated endpoint executed by the cloud platform is configured to enforce the limit on the session;
   reviewing, by the cloud authentication services computer program, a log file from the cloud platform, wherein the log file comprises an activity performed by the user during the session;
   verifying, by the cloud authentication services computer program, that the activity was authorized; and
   updating, by the cloud authentication services computer program, an in-memory entitlements graph to restrict the user in response to activity being unauthorized.

8. A system, comprising:
   a federation server executing a cloud authentication service computer program and an active directory federation service computer program, wherein the cloud authentication service computer program receives authenticating information for a user from the active directory federation service computer program;
   a plurality authentication backend services that receive a validation query from cloud authentication services computer program comprising authenticating information and validates the authenticating information, wherein the authentication backend services comprise a multifactor authentication appliance backend that validates multifactor authentication appliance data, an in-memory entitlements graph that validate a user role, and a ticket validation backend that validates a ticket; and
   a cloud platform executing a trusted federated endpoint that receives an authentication token comprising a limit on a session with the user from the active directory federation service computer program and enforces the limit on the session.

9. The system of claim 8, wherein the federation server further comprises a dynamic-link library (DLL) plugin used by the active directory federation service computer program.

10. The system of claim 9, wherein the DLL plugin comprise a HTML form with a plurality of security questions.

11. The system of claim 8, wherein the in-memory entitlements graph validates the user role based on a stored user role definition.

12. The system of claim 8, wherein the in-memory entitlements graph is periodically updated.

13. The system of claim 8, wherein the limit comprises a time limit.

14. A system, comprising:
- a federation server executing a cloud authentication service computer program and an active directory federation service computer program, wherein the cloud authentication service computer program receives authenticating information for a user from the active directory federation service computer program;
- a plurality authentication backend services that receive a validation query from cloud authentication services computer program comprising authenticating information and validates the authenticating information; and
- a cloud platform executing a trusted federated endpoint that receives an authentication token comprising a limit on a session with the user from the active directory federation service computer program and enforces the limit on the session;
- wherein a log session review computer program further receives a log file comprising an activity performed by the user during the session from the cloud platform and verifies that the activity was authorized;
- wherein the log session review computer program updates an in-memory entitlements graph to restrict the user in response to activity being unauthorized.

* * * * *